United States Patent [19]
Alexander

[11] Patent Number: 5,826,291
[45] Date of Patent: Oct. 27, 1998

[54] ELECTRICALLY ACTUATED DOCK LEVELER

[75] Inventor: James C. Alexander, London, Canada

[73] Assignee: United Dominion Industries, Inc., Charlotte, N.C.

[21] Appl. No.: 735,404

[22] Filed: Oct. 22, 1996

[51] Int. Cl.⁶ .................................................. E01D 1/00
[52] U.S. Cl. ............................................................. 14/71.3
[58] Field of Search ............................. 14/69.5, 71.1, 14/71.3, 71.7

[56] References Cited

U.S. PATENT DOCUMENTS

| | | | |
|---|---|---|---|
| Re. 30,250 | 4/1980 | Catlett | 14/71.3 |
| 2,904,802 | 12/1956 | Hartman | 14/71 |
| 3,835,497 | 9/1974 | Smith | 14/71.3 |
| 3,921,241 | 11/1975 | Smith | 14/71.3 X |
| 3,982,295 | 9/1976 | Burnham | 14/71.3 |
| 4,020,517 | 5/1977 | Waddell | 14/71.5 |
| 4,081,874 | 4/1978 | Artzberger | 14/71.7 |
| 4,097,949 | 7/1978 | Barrett | 14/71.3 |
| 4,110,860 | 9/1978 | Neff et al. | 14/71.7 |
| 4,343,058 | 8/1989 | Loblick | 14/71.7 |
| 4,364,137 | 12/1982 | Hahn | 14/71.3 |
| 4,455,703 | 1/1984 | Fromme et al. | 14/71.3 |
| 4,800,604 | 1/1989 | Alten | 14/71.3 |
| 4,827,549 | 5/1989 | Walker | 14/71.7 |
| 4,944,062 | 7/1990 | Walker | 14/71.3 |
| 5,500,968 | 3/1996 | Hodges | 14/71.7 |
| 5,560,733 | 10/1996 | Dickinson | 14/71.7 X |

*Primary Examiner*—James Lisehora
*Attorney, Agent, or Firm*—Sughrue, Mion, Zinn, Macpeak & Seas, PLLC

[57] ABSTRACT

A dock leveler having a frame adapted to be fixedly mounted at a dock with a deck, pivotally mounted to the frame at one end thereof, and having a pivotable lip at the other end. A spring is mounted to the deck and the frame and supports the deck. An electric actuator is coupled to the deck and moves the deck from a generally horizontal stored position into an operative position. A control circuit is employed for controlling operation of the electrical actuator. A float member couples the actuator to the frame and carries a sensor. A limit switch is responsive to movement of the sensor so that power is terminated to the actuator when the deck reaches either an operative elevated position or a fully lowered position. In the operative elevated position float is provided by having the float member displaced from the frame to allow the electric actuator to move with the deck without being powered to reposition the system.

20 Claims, 3 Drawing Sheets

ELECTRICALLY ACTUATED DOCK LEVELER

CROSS REFERENCE TO RELATED APPLICATION

This application is related to U.S. patent application, Ser. No. 08/650,823, filed May 29, 1996 and commonly assigned.

BACKGROUND OF THE INVENTION

1. Field of the Invention

This invention relates to loading dock equipment and in particular to dock levelers using an electric actuator to move the deck of the dock leveler.

2. Prior Art

Dock levelers employ a variety of techniques to raise the deck from a stored horizontal position to an elevated position where the lip can extend and the deck then "walked down" into position. These include conventional mechanically biased units, hydraulic power and inflatable air bags positioned between the pit floor and the underside of the deck. In co-pending case, Ser. No. 08/650,823, the applicant disclosed the use of an electric actuator as the source of power to raise the deck. This invention is an improvement over that earlier filed application.

This invention uses an electric actuator to power a "manual lift" dock leveler, which is the least expensive type of mechanical pit-style dock leveler. Mechanical springs are used to partially offset the weight of the deck but the deck is still downward biased. The springs are used to reduce the force required by the electric actuator since the cost of actuators with lifting capacities over 1000 pounds would not provide a cost advantage over conventional hydraulic dock levelers. Also, the spring counterbalance enables the deck to be easily lifted by hand for maintenance or when electrical power is lost. The electric actuator provides a clean source of power and leaves the dock leveler pit open for easy inspection and cleaning.

Unlike a hydraulic cylinder which can "float" in response to external force, an electric actuator cannot be forced follow the up and down motion of a dock leveler with the lip resting on a trailer. The use of an electric actuator conventionally requires separate control buttons to extend and retract the mechanism.

This invention however provides for "float" of the electric actuator and also a method of control where the dock leveler has a single "Raise" button. As a result, the operation is similar to the more familiar hydraulic dock leveler. In addition, an optional "Emergency-Stop" switch can be added to the electrical control system to allow the dock leveler to be held in the raised position to avoid damage to cargo on a transport vehicle, or for maintenance.

SUMMARY OF INVENTION

In accordance with this invention a dock leveler has a frame adapted to be fixedly mounted at a dock with a deck, pivotally mounted to the frame at one end thereof, and having a pivotable lip at the other end. A spring is mounted to the deck and the frame and supports the deck. An electric actuator is coupled to the deck and moves the deck from a generally horizontal stored position into an operative position. A control circuit is employed for controlling operation of the electrical actuator. A float member couples the actuator to the frame and carries a sensor. A limit switch is responsive to movement of the sensor so that power is terminated to the actuator when the deck reaches either an operative elevated position or a fully lowered position. In the operative elevated position float is provided by having the float member displaced from the frame to allow the electric actuator to move with the deck without being powered to reposition the system.

This invention has an improved control system which allows the leveler to float yet does not require the actuator to fully retract after each operation. This significantly reduces the time delay from pushing the button until the leveler starts to raise. This invention will be described with reference to the drawing and the description of the preferred embodiment that follows.

DESCRIPTION OF THE PREFERRED EMBODIMENT

Figure 1:
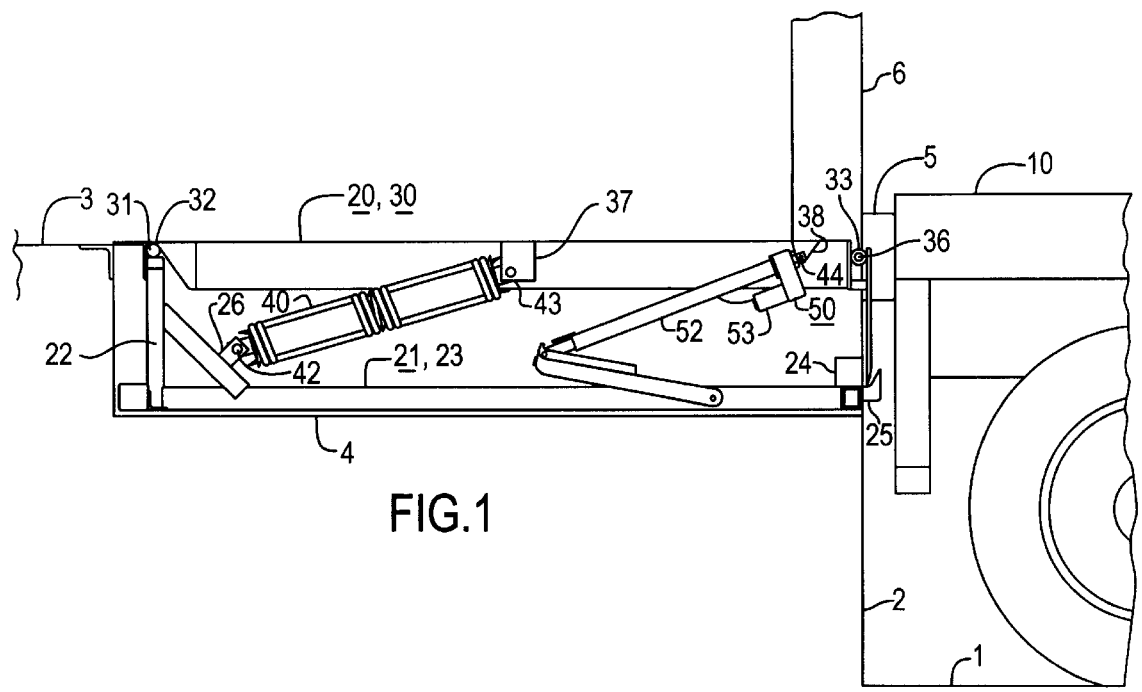
FIG. 1 is a side view of a typical dock and transport vehicle and a partial section of the dock leveler of this invention illustrating the essential components.
Figure 2:
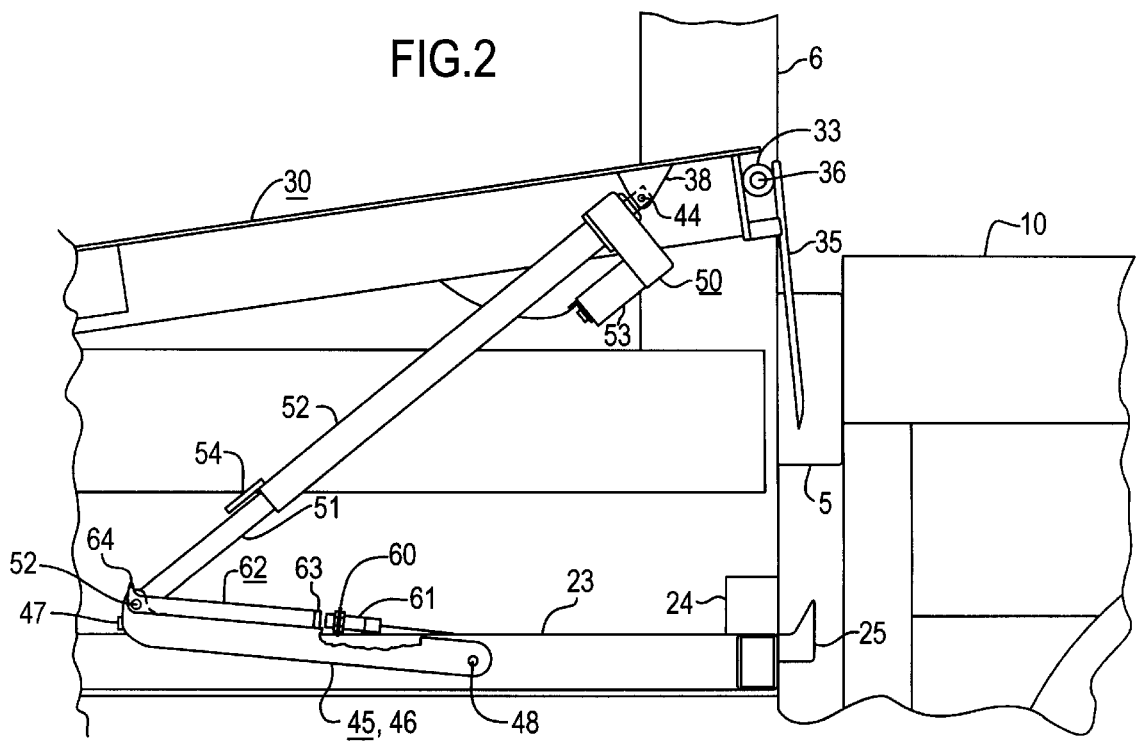
FIG. 2 is partial side view of the dock leveler and the electric actuator partially extended to raise the dock leveler.

Referring now to FIGS. 1 and 2, a side view of a typical loading dock is depicted with a driveway approach 1, a dock face 2 and a dock floor 3. A pit 4 is formed in the dock floor 4. Dock bumpers 5 mounted on the wall 6 limit the position of the transport vehicle 10 relative to the dock face 2. A dock leveler 20 has a frame 21 attached to the pit 4. The frame has vertical back frame members 22 with holes for the hinge pivot pin 32 near the top. Horizontal frame members 23 extend forward to the front of the pit 4 and have ramp stops 24 and lip keepers 25. A deck 30 has rear hinge supports 31. The deck 30 is attached to the frame 21 by a hinge pin 32.

Lip hinge tubes 33 are fastened to the front bar 34 of the deck assembly. A lip 35 is connected to the deck hinge tubes by a lip hinge pin 36. The end of the lip rests in the lip keepers 25 and supports the deck assembly in the stored "cross-traffic" position.

A spring assembly 40 is fastened to brackets 26 on the frame 21 by a pin 42 and to brackets 37 on the deck assembly by a pin 43. The function of this spring will be explained herein. It will be appreciated that the spring is a compression spring as opposed to the usual tension spring.

Referring to FIGS. 1 and 2, an electric actuator 50 has an extendible rod 51 which telescopes inside a barrel 52, a motor 53, and a bar 54 which extends past the end of the barrel. The actuator is fastened to brackets 38 on the deck 30 by a pin 44. A float arm assembly 45 has two arms 46, a cross bar 47 and is fastened by a pin 48 to the frame 20 and by a pin 52 to the end of the rod 51. The majority of the weight of the deck 30 is carried by the counterbalancing force of the spring assembly 40, and the actuator 50 is required to provide only the extra force to raise the deck 30 and extend the lip 35.

Figure 3:
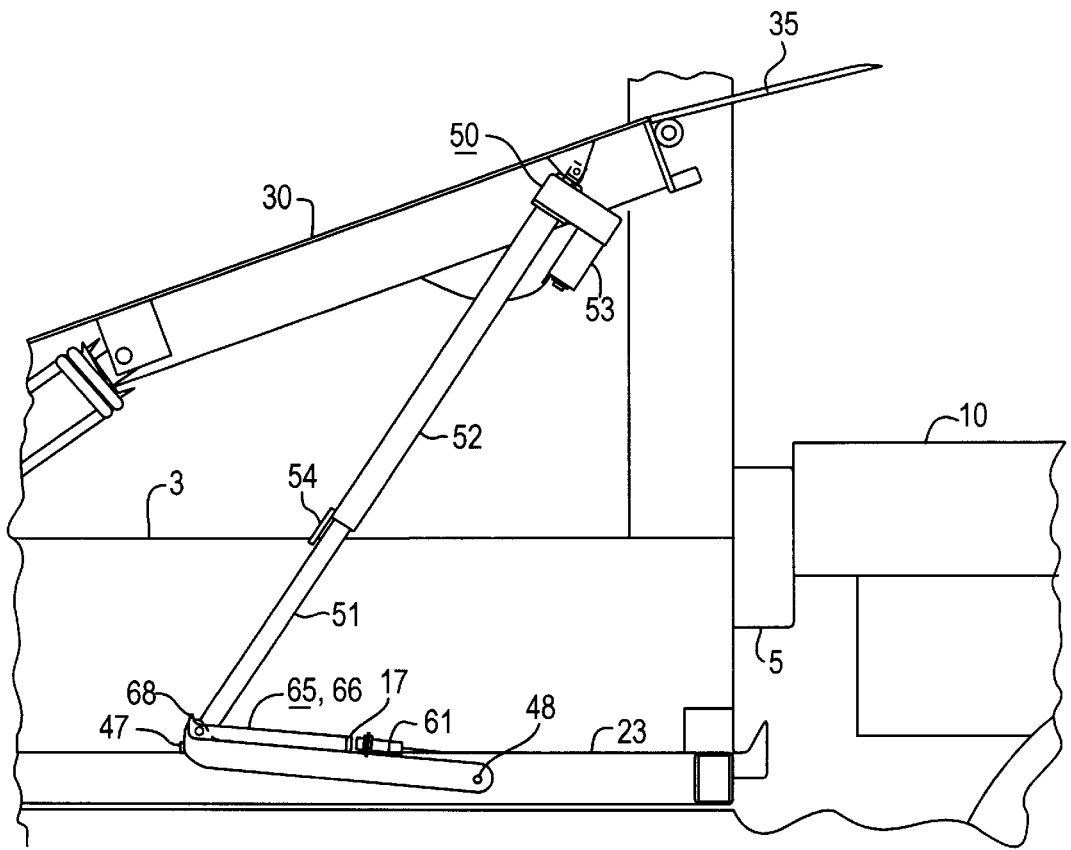
FIG. 3 is a partial side view illustrating the dock leveler fully raised with the lip extended.
Figure 4:
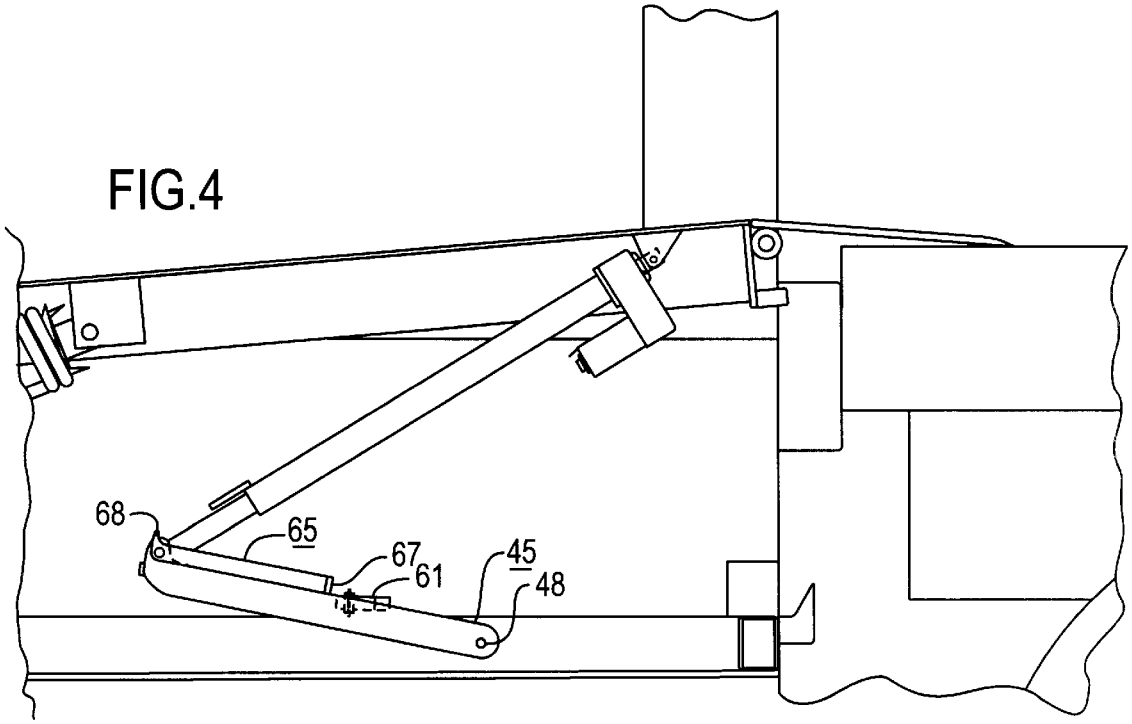
FIG. 4 is a partial side view illustrating the dock leveler supported by the lip resting on the bed of a transport vehicle, and the electric actuator retracted to the float position.
Figure 5:
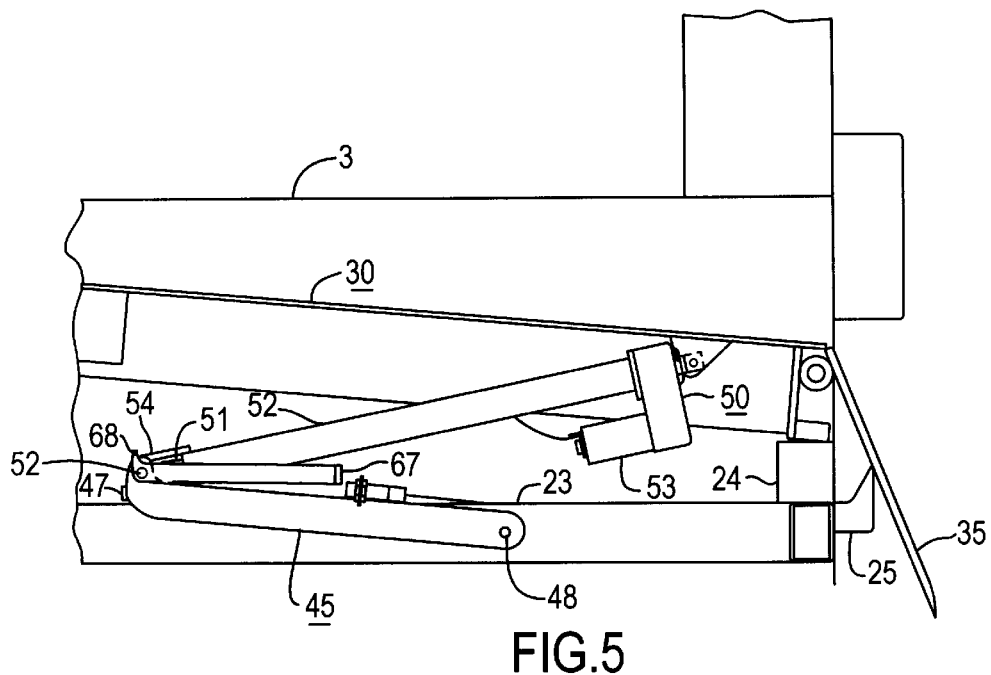
FIG. 5 is a partial side view illustrating the dock leveler fully lowered until it is supported by the leveler frame, and the electric actuator fully retracted.

As illustrated in FIGS. 2, 3 and 4 a plate 60 is attached to the frame and carries a limit switch 61. The switch shown is a proximity sensor which closes an electrical circuit when it senses conductive metal. A sensor bar assembly 65 has a lever 66, target bar 67 and contact bar 68. When the extendible actuator rod 51 is fully retracted as shown in FIG. 5, the bar 54 on the actuator pushes against the contact bar 68 and moves the target bar 68 away from the switch 61. Thus the switch can indicate when the actuator rod 51 is fully retracted.

The operation of the system will be described relative to FIGS. 1–5. FIG. 1 illustrates the dock leveler in the stored position with the lip 35 resting in the lip keepers 25 and the deck assembly 30 level with the floor 2. FIG. 2 illustrates the dock leveler raising as the electric actuator 50 is extending while the operator presses a control button. The compression of the spring 40 is decreased during this raising of the deck to assist in the operation and therefore reduce the power requirement of the motor 53. The float arm assembly 45 has rotated down until the cross bar 47 has engaged the top of the frame 23 (compare with FIG. 1). This fixes the position of the rod 51 relative to the fixed frame. As the electric actuator continues to extend, the deck 30 is fully raised as shown in FIG. 3 and the lip 35 is then extended by a conventional lip extension mechanism, not shown. When the lip has extended, the operator releases the button and the actuator rod 51 begins to retract. The leveler lowers until the lip 35 rests on the trailer 10 as shown in FIG. 4.

The actuator continues to run until the bar 47 of the float arm assembly 45 is lifted off of the frame member 23 and the target bar 67 is lifted above the proximity switch 61. This is illustrated by comparing FIGS. 3 and 4. Thus the leveler is able to float up and down with the vehicle and the actuator is stopped even though it has not fully retracted. If the truck floats down, the target bar 67 activates the proximity switch 61 and the actuator retracts until once again the float arm assembly 45 is lifted off of the frame 23 and the target bar 67 is moved away from the proximity switch.

FIG. 5 illustrates the dock leveler fully lowered until it is supported by the stop bars 24 on the frame, and the electric actuator fully retracted. The bar 54 on the actuator has engaged the contact bar 68 on the sensor assembly 65 causing it to rotate and raise the target bar 67 away from the proximity switch 61 and stop the motor. This allows almost the entire stroke length of the actuator to be used. Otherwise a portion of the actuator stroke would be wasted to provide unnecessary downward float when the leveler is fully lowered.

Figure 6:
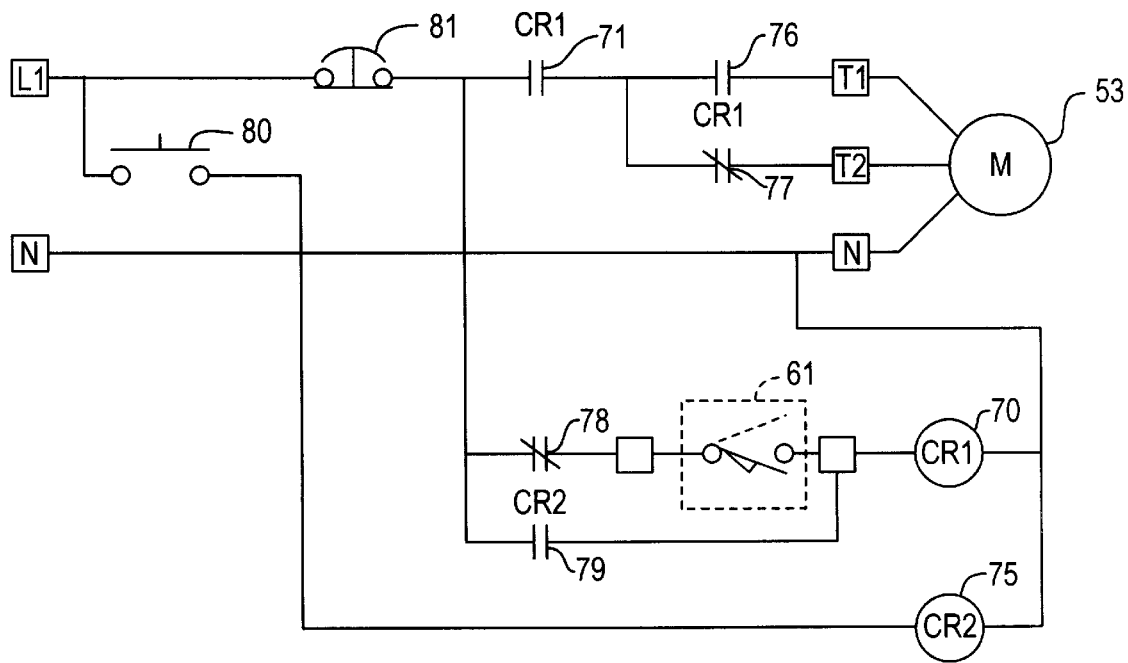
FIG. 6 is a circuit diagram of the electrical control circuit which provides single button operation of the dock leveler.

The electric control circuit is shown schematically in FIG. 6. The electrical circuit uses a single push button 80 to cause the actuator to extend. As the float arm assembly moves down to rest on the frame, the sensor bar 65 engages the limit switch 61. When the operator releases the button, the motor 53 reverses direction and the rod 51 retracts. When the leveler is stopped by the lip 35 resting on the truck 10 or the lip keepers 25, the target bar 67 disengages the switch 61 and stops the motor. As shown on FIG. 6, the electric motor 53 has three wires connected to terminals T1, T2 and N. A relay 70 has a normally open contact 71. A relay 75 has normally open contacts 76 and 77 and normally closed contacts 78 and 79. When the dock leveler is at rest, the switch 61 is held open and the motor 53 is not energized.

When the Raise button 80 is pressed, the relay 75 is energized and causes the contacts 77 and 78 to open and the contacts 76 and 79 to close. Power flows through contact 79 to the relay 70 which then provides power through contacts 71 and 76 to terminal T1 of the motor 53 and the actuator extends to raise the deck. As the actuator begins to extend the limit switch 61 closes. When the lip is extended, the operator releases the raise button 80. The relay 75 is not energized and power flows through the contact 78 and switch 61 to maintain power to the relay 70. Power continues through contact 71 but is now directed through contact 77 to terminal T2 of the motor 53. This reverses the direction of the motor 53 and the actuator retracts, lowering the deck 30. When the actuator raises the float arm assembly 45 and the target 67 away from the proximity switch 61, the switch opens and the motor stops. The deck is now in an operative position supported by the lip, and with the actuator retracted sufficiently to allow downward float.

FIG. 6 also illustrates an optional "Emergency-Stop" switch 81 which can be added to the electrical control system to interrupt power to the motor 53 and allow the dock leveler to be held in the raised position during operation or for maintenance.

The electrical circuit shown in FIG. 6 employs an alternating current (AC) motor. A similar circuit could be constructed to control a direct current (DC) motor. It is apparent that other modifications can be made within the scope of this invention.

For example other sensors and switch arrangements may be used. Sensors other than limit switches can be employed and the sensing arrangement can be reversed with the sensor carried by the float member and the target fixed.

I claim:
1. A dock leveler comprising:
   a frame adapted to be fixedly mounted at a dock;
   a deck, pivotally mounted to said frame at one end thereof, and having a pivotable lip at the other end thereof;
   an electric actuator operably coupled to said deck for moving said deck from a generally horizontal stored position into an operative position,
   means pivotally coupling said electric actuator to said dock leveler for providing float for said deck, and
   a circuit for controlling operation of said electrical actuator.

2. A dock leveler according to claim 1 further comprising, a limit switch responsive to position of said coupling means to terminate actuator operation when said deck is in said operative position.

3. A dock leveler according to claim 1 wherein said electric actuator comprises a reversible electric motor, said circuit comprises a source of electrical power and means for driving said actuator in a first direction until said deck is lifted, and said circuit including means to terminate operation of said actuator when said coupling means is in an operative position to provide float for said deck.

4. A dock leveler according to claim 3 wherein said circuit further comprises means to reverse movement of said actuator and includes a switch and a relay, wherein when said switch is open said relay is energized to reverse current to said electric motor and thereby reverse movement of said actuator.

5. A dock leveler according to claim 1 wherein said actuator comprises a cylinder and an extendible rod coupled at one end to said coupling means, a limit switch mounted in a fixed position, a target carried by said coupling means with one end in proximity to said limit switch and other end proximate with an end of said cylinder whereby movement of said target in response to contact with said cylinder moves said target away from said limit switch to stop said actuator.

6. A dock leveler according to claim 1, wherein said coupling means comprises an arm member pivotally mounted to said frame at one end and a stop member at an opposite end engagable with said frame, said coupling means movable to position said stop member above said frame as said actuator retracts to provide for downward float.

7. A dock leveler according to claim 6 wherein said electric actuator comprises a reversible electric motor driving an extensible rod, circuit comprises source of electrical power selectively coupled to said electric motor, a normally open contact switch, a first relay to power said motor in one direction, a first relay to power said motor in an opposite direction and a limit switch responsive to movement of said coupling means to terminate power to said motor when said stop member is positioned above said frame.

8. A dock leveler according to claim 7 further comprising a target carried by said coupling means, said limit switch fixed on said frame and responsive to movement of said target to terminate power to said actuator as said actuator retracts.

9. A dock leveler according to claim 8 wherein said actuator carries a bar, said coupling means having a stop to engage said bar as said actuator retracts such that said target is moved away from said limit switch as said actuator lowers said deck and downward movement is stopped.

10. A dock leveler according to claim 1 further comprising a spring is mounted to support said deck independently from said actuator.

11. A pit type dock leveler comprising:

a frame fixedly mounted in a pit at a dock;

a pivotal deck mounted to said frame at one end of the deck;

a spring coupled to said frame and said deck to support said deck, an electric actuator coupled to said deck for moving said deck from a generally horizontal stored position into an operative position and, a float member pivotally coupling said electric actuator to said frame.

12. A dock leveler according to claim 11 further comprising, a limit switch fixedly mounted to said frame and responsive to movement of said float member to terminate actuator operation when said deck is in said operative position.

13. A dock leveler according to claim 12 wherein said float member comprises an arm pivotally mounted to said frame at one end thereof and to said electric actuator at the other end thereof and a sensor bar mounted to said arm for movement relative thereto.

14. A dock leveler according to claim 13 wherein said sensor bar is pivotally mounted to said arm, said sensor bar having a member engagable with said actuator to pivot said sensor bar relative to said arm thereby moving said sensor bar away from said limit switch to terminate power to said actuator.

15. A dock leveler according to claim 14 wherein said actuator comprises an cylinder carrying a rod at one end, said rod engaging said member on said sensor bar when said actuator retracts and moves said sensor bar away from said limit switch and thereby cease power to said actuator.

16. A dock leveler according to claim 11, wherein said float member is pivotally positioned with one end above said frame to provide clearance for said actuator and float for said deck as said lip moves in response to movement of a vehicle.

17. A dock leveler according to claim 16 wherein said electric actuator comprises a reversible electric motor driving an extensible rod, said extensible rod coupled to said float member, a control circuit comprising a source of electrical power selectively coupled to said electric motor, a normally open contact switch, a first relay to power said motor in one direction, a first relay to power said motor in an opposite direction and a limit switch mounted and responsive to movement of said float member to terminate power to said motor.

18. A dock leveler according to claim 11 further comprising a stop member carried by said float member and engaging said frame to fix the position of said float member, such that subsequent retraction of said actuator lifts said float member above said frame to provide float for said deck.

19. A dock leveler according to claim 18 wherein said float member carries a sensor, a limit switch mounted to said frame and responsive to said sensor that movement of said actuator to lower said deck causes said float member and said sensor to raise away from said limit switch thereby terminating power to said actuator.

20. A dock leveler according to claim 11 wherein said spring supports said deck independent of said actuator.

* * * * *